US006021493A

United States Patent [19]

Cromer et al.

[11] Patent Number: 6,021,493

[45] Date of Patent: *Feb. 1, 2000

[54] SYSTEM AND METHOD FOR DETECTING WHEN A COMPUTER SYSTEM IS REMOVED FROM A NETWORK

[75] Inventors: Daryl C. Cromer, Cary; Richard W. Cheston, Morrisville; Howard J. Locker, Cary; David Rhoades, Apex; James Peter Ward, Raleigh, all of N.C.

[73] Assignee: International Business Machines Corporation, Armonk, N.Y.

[ * ] Notice: This patent is subject to a terminal disclaimer.

[21] Appl. No.: 08/965,550

[22] Filed: Nov. 6, 1997

[51] Int. Cl.[7] .................................................. G08B 21/00
[52] U.S. Cl. .................................. 713/200; 380/3; 380/4; 380/7; 380/23; 340/568.1; 340/568.4; 340/686.1; 340/571; 340/505; 340/524
[58] Field of Search ..................................... 713/200, 202; 380/3, 4, 23, 7; 340/541, 505, 524, 686.1, 568.4, 568.1, 571, 687

[56] References Cited

U.S. PATENT DOCUMENTS

| | | | |
|---|---|---|---|
| 4,121,201 | 10/1978 | Weathers | 340/524 |
| 4,141,006 | 2/1979 | Braxton | 340/505 |
| 4,245,245 | 1/1981 | Matsumoto et al. | 358/122 |
| 4,860,379 | 8/1989 | Schoeneberger et al. | 455/5 |
| 4,935,725 | 6/1990 | Turnau | 340/568 |
| 4,991,123 | 2/1991 | Casamassima | 340/825.08 |
| 5,051,723 | 9/1991 | Long et al. | 340/566 |
| 5,091,713 | 2/1992 | Horne et al. | 340/541 |
| 5,142,269 | 8/1992 | Mueller | 340/568 |
| 5,388,156 | 2/1995 | Blackledge, Jr. et al. | 340/4 |
| 5,396,636 | 3/1995 | Gallangher et al. | 713/310 |
| 5,404,544 | 4/1995 | Crayford | 340/825.34 |
| 5,406,260 | 4/1995 | Cummings et al. | 340/568 |
| 5,432,939 | 7/1995 | Blackledge, Jr. et al. | 380/3 |
| 5,568,611 | 10/1996 | Khatri et al. | 380/23 |
| 5,574,786 | 11/1996 | Dayan et al. | 380/4 |
| 5,590,376 | 12/1996 | Kou | 710/18 |
| 5,712,973 | 1/1998 | Dayan et al. | 380/4 |
| 5,742,758 | 4/1998 | Dunham et al. | 713/200 |

*Primary Examiner*—Robert W. Beausoliel, Jr.
*Assistant Examiner*—Wasseem H. Hamdan
*Attorney, Agent, or Firm*—Anthony N. Magistrale

[57] ABSTRACT

Described is a system which includes at least one computer system connected to a main computer system via a data transmission network. The at least one computer system has a network connector for communicating data with the main computer. The network connector is supplied with auxiliary power and is operative to communicate with the main computer regardless of whether the at least one computer system is in a normal operating state. The main computer includes a program for detecting when the at least one computer system has been disconnected from the data transmission network. The program sends a first packet to the at least one computer system via the network. The at least one computer system is operative to receive the first packet and respond by sending a second packet to the main computer. The second packet includes data which specifically identifies the at least one computer system.

22 Claims, 6 Drawing Sheets

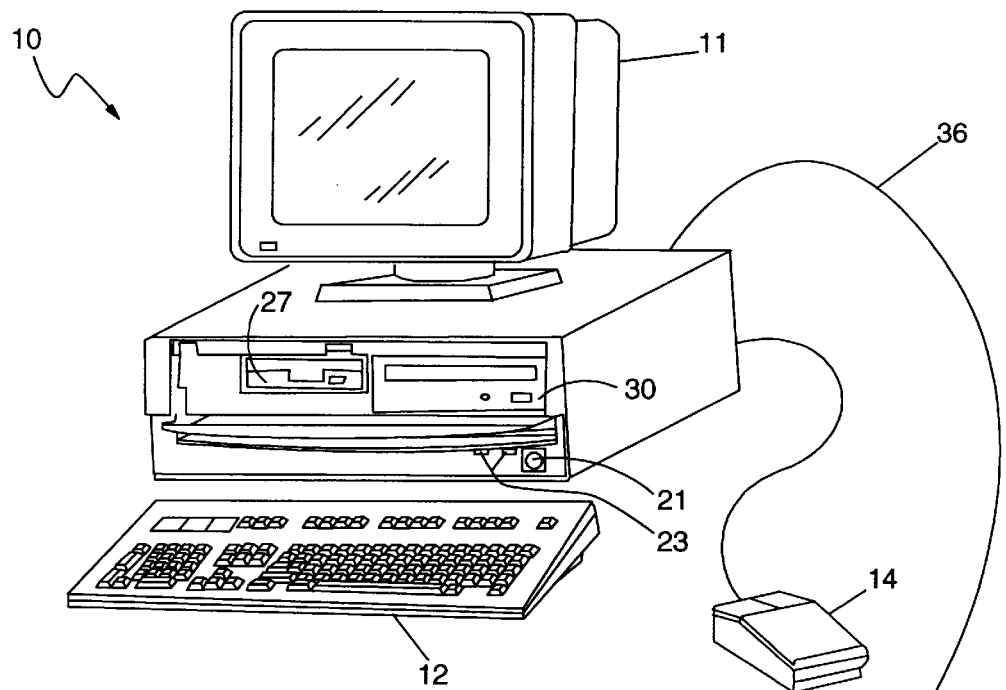
FIG. 1
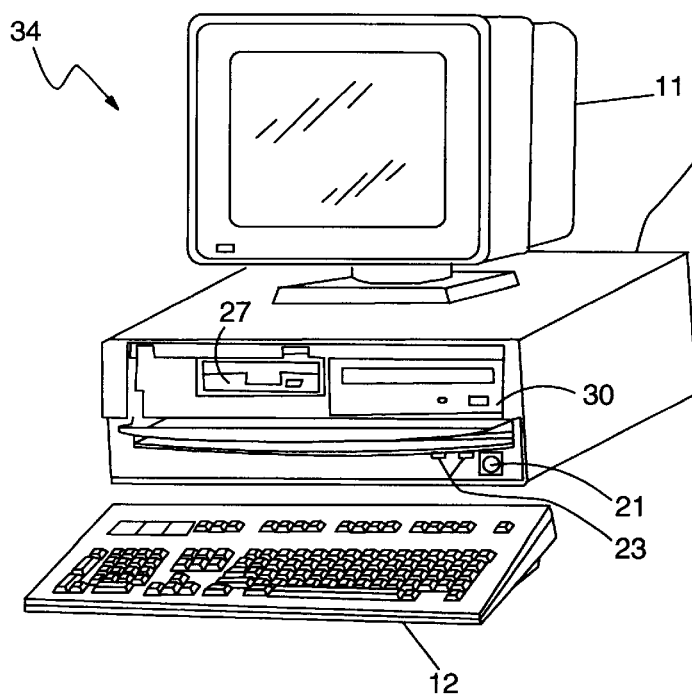

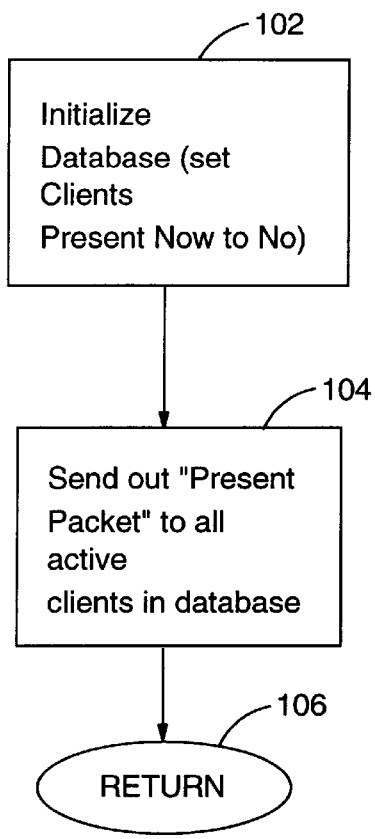

| Table Database | | | |
|---|---|---|---|
| MAC (Network Card) Address | Physical Location | Client Present Now (Yes/No) | Active Clients |
| Client 1 | Office 1 | No | Yes |
| Client 2 | Office 2 | No | Yes |
| Client 3 | Office 3 | No | Yes |
| Client 4 | Office 4 | No | Yes |
| ...... | ...... | | ...... |
| Client N | Office N | No | Yes |

FIG. 5

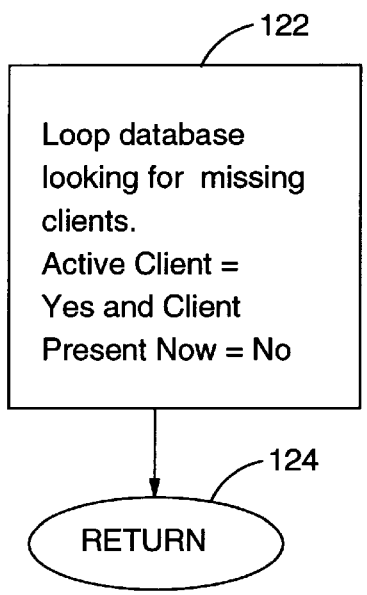

| Table Database | | | |
|---|---|---|---|
| MAC (Network Card) Address | Physical Location | Client Present Now (Yes/No) | Active Clients |
| Client 1 | Office 1 | Yes | Yes |
| Client 2 | Office 2 | Yes | Yes |
| Client 3 | Office 3 | Yes | Yes |
| Client 4 | Office 4 | No | Yes |
| ...... | ...... | | ...... |
| Client N | Office N | Yes | Yes |

FIG. 7

Table Database

| MAC (Network Card) Address | Physical Location | Client Present Now (Yes/No) | Active Clients |
|---|---|---|---|
| Client 1 | Office 1 | No | Yes |
| Client 2 | Office 2 | Yes | Yes |
| Client 3 | Office 3 | No | Yes |
| Client 4 | Office 4 | No | Yes |
| ...... | ...... |  | ...... |
| Client 5 | Office N | No | Yes |

SYSTEM AND METHOD FOR DETECTING WHEN A COMPUTER SYSTEM IS REMOVED FROM A NETWORK

RELATED APPLICATIONS

The present invention is believed to be related to the following issued patent and pending applications:

U.S. Pat. No. 5,396,636, "REMOTE POWER CONTROL VIA DATA LINK";

application Ser. No. 08/965,140, filed Nov. 6, 1997, and entitled "COMPUTER SYSTEM FOR SENDING AN ALERT SIGNAL OVER A NETWORK WHEN A COVER OF SAID SYSTEM HAS BEEN OPENED" (Attorney Docket No. RP9-96-018); and application Ser. No. 08/965,341, filed Nov. 6, 1997, and entitled "COMPUTER SYSTEM AND METHOD TO DISABLE SAME WHEN NETWORK CABLE IS REMOVED" (Attorney Docket No. RP9-97-009).

BACKGROUND OF THE INVENTION

1. Field of the Invention

The present invention relates to computer systems coupled to a network and more particularly to a system and method for polling computer systems (clients) connected to a network in order to detect when a computer system has been removed or stolen from the network.

2. Description of Related Art

Personal computer systems are well known in the art. Personal computer systems have attained widespread use for providing computer power to many segments of today's modern society. Personal computers can typically be defined as a desktop, floor standing, or portable microcomputer that is comprised of a system unit having a single central processing unit (CPU) and associated volatile and non-volatile memory, including random access memory (RAM) and basic input output system read only memory (BIOS ROM), a system monitor, a keyboard, one or more flexible diskette drives, a CD-ROM drive, a fixed disk storage drive (also known as a "hard drive"), a so-called "mouse" pointing device, and an optional printer. One of the distinguishing characteristics of these systems is the use of a motherboard or system planar to electrically connect these components together. Examples of such personal computer systems are IBM's PC 300 series and IBM's Aptiva Series.

Theft of personal computers is becoming a major industry problem. As a result, there has been an ever increasing need to provide security for computer systems against the unauthorized removal or theft thereof. Since modern computer systems are generally more compact and more easily transportable, it is even more difficult to secure against the unauthorized removal or theft thereof.

In addition, today, computer networks are employed to provide efficient computing capabilities throughout a large work area. Existing computer networks generally include a number of remotely located computer systems coupled via a data link to a server system or a central processing center. The wide dissemination of such systems at remote locations has made the systems an even more accessible target for computer thieves.

Accordingly, a number of methods have been developed for guarding against the unauthorized removal of computer systems. For example, U.S. Pat. No. 5,406,260 discloses a method and system for detecting the disconnection of electronic equipment from a network using internal current loops, current sensors and optional alarms. The system includes current loops internally coupled to protected pieces of equipment so that each piece of associated equipment has an associated current loop. A low current power signal is provided to each of the current loops. A sensor monitors the current flow through each current loop to detect removal of the equipment from the network. Removal of a piece of hardware breaks the current flow through the associated current loop which in turn may activate an alarm. However, such systems and methods are very complex and too expensive for today's computer systems.

It is therefore desirable to provide a system and method for detecting when a computer system has been removed or stolen from a network and notifying a network administrator.

SUMMARY OF THE INVENTION

The present invention relates to a system and method for detecting when a computer system is removed from a network. One embodiment of the present invention is directed to a system which includes at least one computer system connected to a main computer system via a data transmission network. The at least one computer system has a network connector for communicating data with the main computer. The network connector is supplied with auxiliary power and is operative to communicate with the main computer regardless of whether the at least one computer system is in a normal operating state. The main computer includes means for detecting when the at least one computer system has been disconnected from the data transmission network.

The detecting means can be a program which sends a first packet to the at least one computer system via the network. The at least one computer system is operative to receive the first packet and respond by sending a second packet to the main computer regardless of whether the at least one computer system is in a normal operating state. The second packet includes data which specifically identifies the at least one computer system.

Another embodiment of the present invention is directed to a method for detecting when a computer system has been disconnected from a data transmission network. The method includes providing a plurality of computer systems connected to a main computer system via a data transmission network, each of said plurality of computer systems having a network connector for communicating data with the main computer. The network connectors are supplied with auxiliary power and are operative to communicate with the main computer regardless of whether the corresponding computer system is in a normal operating state. The method further includes detecting whether each one of the plurality of computer systems is connected to the network and sending an alert message from the main computer to a network administrator only if it is determined that at least one of the plurality of computer systems is not connected to the network.

BRIEF DESCRIPTION OF THE DRAWINGS

FIG. 1 is a perspective view of a personal computer embodying this invention and a LAN station remote computer system;

FIG. 5 is a flow diagram of an initialize database routine in accordance with the present invention along with a status of a table database stored in the remote computer 34 and used by a LAN administrator to keep track of certain information regarding each of the client systems;

FIG. 7 is a flow diagram of another routine in accordance with the present invention along with a status of the table database of FIG. 5.

DETAILED DESCRIPTION OF THE INVENTION

Figure 2:
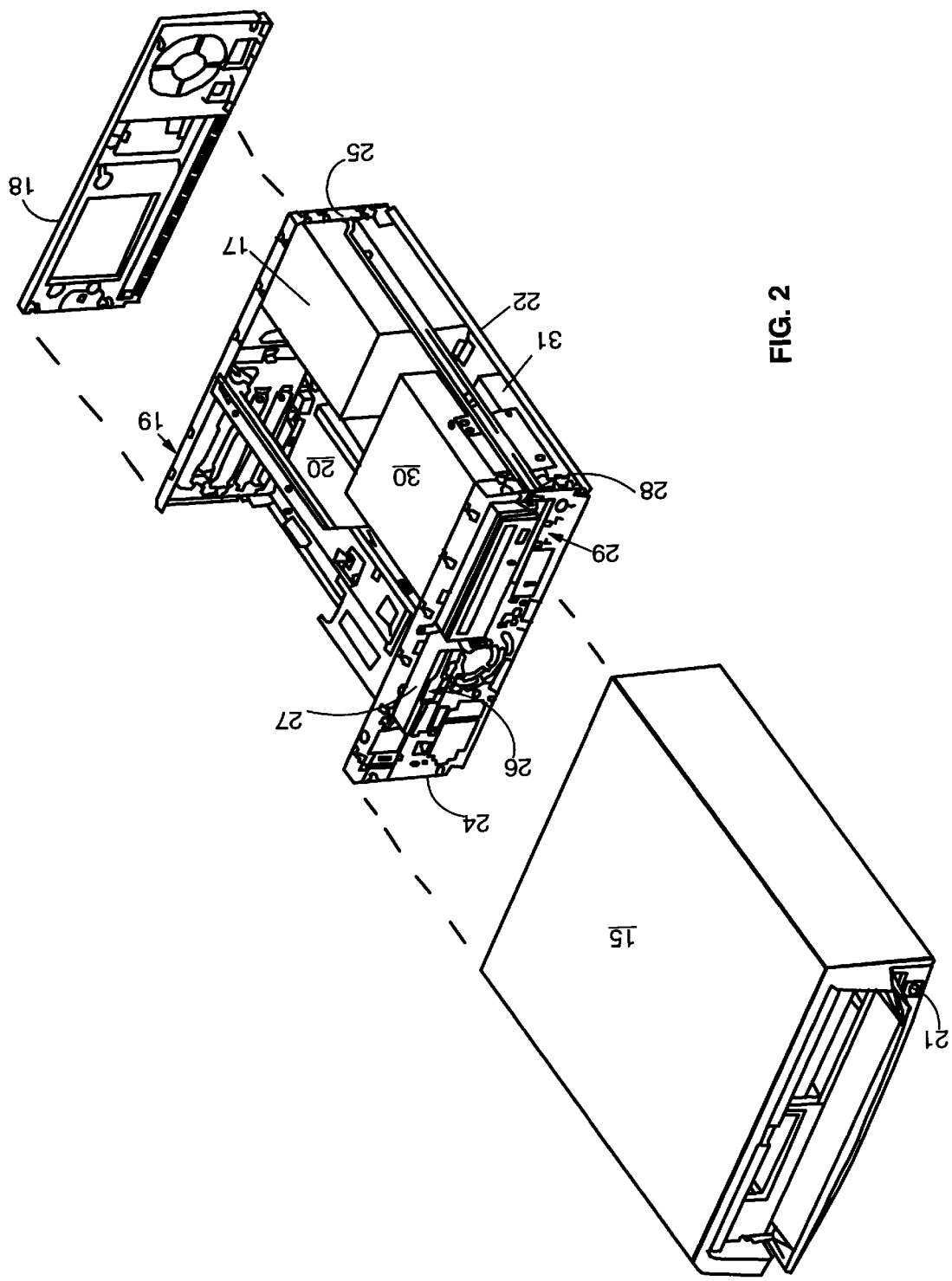
FIG. 2 is an exploded perspective view of certain elements of the personal computer of FIG. 1 including a chassis, a cover, an electromechanical direct access storage device and a planar board and illustrating certain relationships among those elements.

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention. This application is written for those very familiar with all aspects of computer system design.

Referring now more particularly to the accompanying drawings, a computer system embodying the present invention is there shown and generally indicated at 10 (FIG. 1). As mentioned hereinabove, the computer 10 may have an associated display monitor 11, keyboard 12, mouse 14, and printer or plotter (not shown). The computer 10 has a cover 15 which is a decorative outer member (FIG. 2) and a back plate shield member 18 which cooperate with a chassis 19 in defining an enclosed, shielded volume for receiving electrically powered data processing and storage components for processing and storing digital data. At least certain of these components are mounted on a multi layer planar 20 or motherboard which is mounted on the chassis 19 and provides a means for electrically interconnecting the components of the computer 10 including those identified above and such other associated elements as floppy disk drives, various forms of direct access storage devices, accessory adapter cards or boards, and the like. As pointed out more fully hereinafter, provisions are made in the planar 20 for the passage of input/output signals to and from the operating components of the microcomputer.

The system 10 has a power supply 17, a power button 21, also herein referred to as switch 21, and LEDs 23 for power indication and hard disk activity. The chassis 19 has a base indicated at 22, a front panel indicated at 24, and a rear panel indicated at 25 (FIG. 2). The front panel 24 defines at least one open bay (and in the form illustrated, four bays) for receiving a data storage device such as a disk drive for magnetic or optical disks, a tape backup drive, or the like. In the illustrated form, a pair of upper bays 26, 28 and a lower bay 29 are provided. One of the upper bays 26 is adapted to receive peripheral drives of a first size (such as those known as 3.5 inch drives) while the other 28 is adapted to receive drives of a different size (such as a CD ROM drive) and the lower bay is adapted to receive another drive. One floppy disk drive is indicated at 27 in FIGS. 1 and 2, and is a removable medium direct access storage device (DASD) capable of receiving a diskette inserted there into and using the diskette to receive, store and deliver data as is generally known. One CD ROM drive is indicated at 30 in FIGS. 1 and 2 and is a removable medium direct access storage device capable of receiving a compact disc inserted there into and using the disc to deliver data as is generally known. One hard disk drive is indicated at 31 in FIG. 2 and is a fixed medium direct access storage device capable of storing and delivering data as is generally known.

Figure 3:
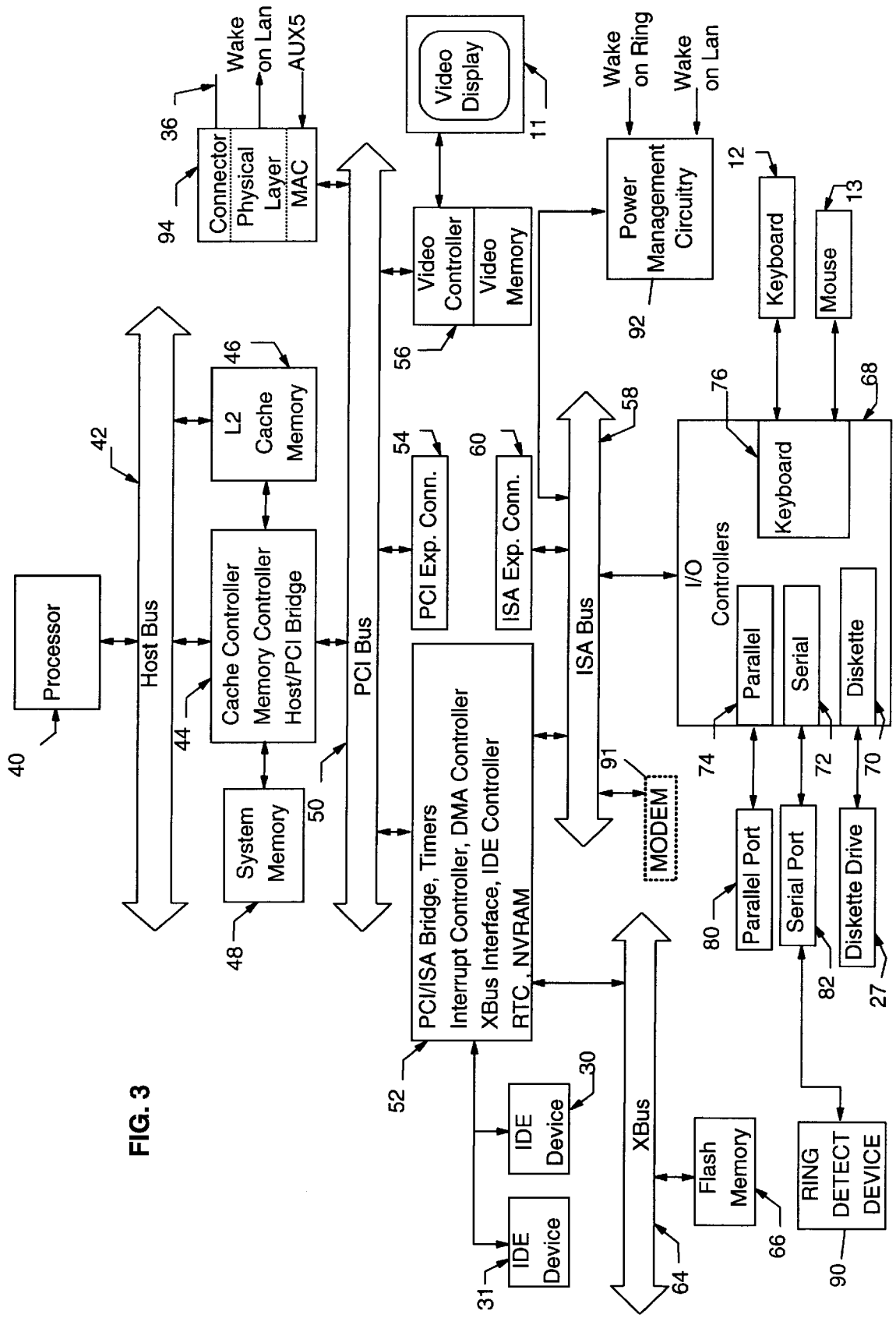
FIG. 3 shows a block diagram of certain components of the personal computer of FIGS. 1 and 2.

Prior to relating the above structure to the present invention, a summary of the operation in general of the personal computer system 10 may merit review. Referring to FIG. 3, there is shown a block diagram of a personal computer system illustrating the various components of the computer system such as the system 10 in accordance with the present invention, including components mounted on the planar 20 and the connection of the planar 20 to the IO expansion connectors and other hardware of the personal computer system. Connected to the planar 20 is the system CPU or processor 40 which is connected directly to a high speed CPU host bus 42. A first system core logic chipset 44 and L2 cache memory 46 are also connected to the host bus 42. The first core logic chipset 44 includes a memory control unit, a L2 cache controller and a peripheral component interconnect (PCI) bridge. The memory control unit is further connected to a volatile random access memory (RAM) 48. The RAM memory 48 is composed of one or more memory modules. The memory controller includes the logic for mapping addresses to and from the microprocessor 40 to particular areas of RAM 48. The cache controller is operatively coupled to the L2 cache memory 46.

The first core chipset 44 can be, for example, a Triton VX chip which is sold by Intel Corporation. The PCI bridge within chipset 44 provides an interface between the local bus 42 and a PCI bus 50. Connected to the PCI bus 50 is a second core chipset 52 and a plurality of PCI expansion connectors 54 for receiving PCI bus compatible peripheral cards. One such peripheral card is a video controller 56. The video controller 56 includes video memory and is coupled to the monitor or video display terminal 11. The chipset 52 can be, for example, an PIIX3 chip which is also sold by Intel Corporation.

The chipset 52 contains a bus control and timing unit, a plurality of timers, an interrupt controller, a direct access memory (DMA) unit, nonvolatile CMOS RAM, also herein referred to as NVRAM, a CMOS real-time clock (RTC), an XBus controller, a PCI/ISA bridge and an integrated drive electronics (IDE) controller. The PCI/ISA bridge provides an interface between the PCI bus 50 and an optional feature or expansion bus such as the Industry Standard Architecture (ISA) bus 58. Connected to the ISA bus 58 are a plurality of ISA expansion connectors 60 for receiving ISA adapter cards (not shown). ISA adapter cards can be pluggably connected to the ISA expansion connectors 60 and may provide additional IO devices or memory for the system 10.

The IDE controller provides for the attachment of IDE compatible storage devices such as the fixed disk drive 31 and CD-ROM drive 30.

The real-time clock is used for time of day calculations and the NVRAM is used to store system configuration data. That is, the NVRAM will contain values which describe the present configuration of the system 10. For example, NVRAM 96 contains information describing the type of fixed disk or diskette, the list of IPL devices set by a user and the sequence to be used for a particular power on method, the type of display, the amount of memory, time, date, etc. Furthermore, these data are stored in NVRAM whenever a special configuration program, such as configuration/setup, is executed. The purpose of the configuration/setup program is to store values characterizing the configuration of the system to NVRAM.

Coupled to the ISA bus 58 is a multi-function IO controller 68 such as, for example, a National Semiconductor PC87306. The IO controller 68 contains a variety of IO adapters and other components such as the diskette adapter 70, serial adapter 72, a parallel adapter 74 and keyboard controller 76. The diskette adapter 70 provides the interface to the diskette drive 27. The serial adapter 72 has an external port connector 82 for attachment of external devices such as ring detect device 90. The parallel adapter 74 has an external port connector 80 for attachment of external devices such as printers (not shown). The keyboard controller 76 is the interface for the keyboard 12 and the mouse 13.

Power management circuitry 92 is also coupled to the ISA bus 58 for changing the system 10 between various power states (e.g., off, standby, sleep, suspend and normal operating states). The present invention will operate in any of these power states. Accordingly, the description which follows will be independent of power state.

The circuitry 92 is supplied with auxiliary power from the power supply 17 when the system 10 is in the off state so that it can monitor events which cause the system 10 to turn on. For example, when the system is in the off state and a telephone ring is detected by ring detect device 90, a wake on ring signal is sent from the device 90 through serial port 82 to the power management circuitry 92. In response to receiving this signal the circuitry 92 will cause system 10 to change to the normal operating state. The ring detect device 90 can be, for example, an external modem or any other device which can detect a telephone ring and generate the wake on ring signal to the circuitry 92. Such other devices can include motion sensors, voice activated sensors, light sensors, etc. In addition, an internal modem 91 could be connected directly to the ISA bus 58 or PCI bus 50. The modem 91 is wired to a modem pin on the planar 20 and is operative to generate the ring signal when it detects a telephone ring.

The circuitry 92 also includes a timer which is configurable by a user to expire after a predetermined period of time. When the timer expires, the circuitry 92 will cause the system 10 to change from the off state to the normal operating state.

A LAN adapter or subsystem 94 can be coupled to either the PCI bus 50 or the ISA bus 58 for allowing system 10 to communicate with a remote computer 34 or server over a LAN via a connection or link 36. The LAN adapter is supplied with auxiliary power (AUX5) from the power supply 17 when the system 10 is off. When the LAN adapter 94 is set in a wake up mode it scans all incoming frames from the LAN addressed to system 10 for a specific data frame. If the LAN adapter scans a frame and does not find the specific data frame, it discards the frame and takes no further action. If the LAN adapter 94 detects the specific data frame, however, it alerts the power management circuitry 92 via a wake on LAN signal to power on the system 10 (i.e., change from the off state to the normal operating state). The LAN adapter can be, for example, an IBM Auto Wake Token-Ring ISA Adapter.

The LAN adapter 94 includes a Media Access Controller (MAC). The MAC serves as an interface between a shared data path (e.g., Ethernet serial data path) and the PCI bus 50 (or ISA bus 58 if adapter 94 were connected to the ISA bus 58). The MAC performs a number of functions involved in the transmission and reception of data packets. For example, during the transmission of data, the MAC assembles the data to be transmitted into a packet with address and error detection fields. Conversely, during the reception of a packet, the MAC disassembles the packet and performs address checking and error detection. In addition, the MAC typically performs encoding/decoding of digital signals transmitted over the shared path and performs preamble generation/removal as well as bit transmission/reception.

The LAN adapter 94 can further include a media independent interface (MII) (not shown) which is a local bus between the MAC and a physical layer. The physical layer receives parallel data from the MAC/MII local bus and converts it to serial data for transmission over cable 36. The physical layer is also responsible for wave shaping and provides analog voltages to cable 36. The LAN adapter 94 further includes a connector which is the physical interface between the adapter 94 and cable 36.

Alternative to the LAN adapter 94, a LAN connector or connection could be imbedded on the planar 20 and would include all the same connections and components as the adapter 94. Such a connector will be referred to as LAN subsystem 94.

A planar XBus 64 is coupled to the PCI bus 50 and ISA bus 58 via chipset 52. The planar XBus 64 includes address, data, and control components respectively. The planar XBus 64 is an additional IO bus in system 10 and is used as a local bus to support slow speed peripheral devices that reside on the planar board. Attached to the XBus 64 is a flash memory (FM) module or chip 66.

The flash memory 66 is an electrically erasable programmable read only memory (EEPROM) module or chip and includes the BIOS that is used to interface between the IO devices and the operating system. BIOS stored in memory 66 can be copied into RAM 48 to decrease the execution time of BIOS. FM 66 is further responsive to the XBus controller (via ROMSEL signal) within chipset 52. If System RAM 48 is disabled for the BIOS address range then access requests to that address range are passed through the host bridge 44 and the PCI/ISA bridge to memory 66. If System RAM 48 is enabled for the BIOS address range then access requests to that address range are directed to system RAM 48.

While the present invention is described hereinafter with particular reference to the system block diagram of FIG. 3, it is to be understood at the outset of the description which follows that it is contemplated that the apparatus and methods in accordance with the present invention may be used with other hardware configurations of the planar board. For example, the system processor 40 could be an Intel Pentium processor, Cyrix 586-P75 processor or Advanced Micro Devices 8486 processor or any other suitable microprocessor.

The microcomputer system 10 is shown with 16 megabytes of system memory 48. It is understood that additional memory can be interconnected as represented in FIG. 3 by installing additional or higher-density memory modules. For purposes of illustration only, the present invention is described with reference to the 16 megabyte memory configuration.

Referring back to FIG. 1, there is shown the local computer system 10 along with a perspective view of a remote personal computer 34. While not here shown or described in detail, the remote computer system 34 has components and attributes like those illustrated and described with regard to FIG. 3 and those additional elements appropriate to provide the non-volatile storage mentioned, as is known to the person skilled in the appropriate arts. The remote computer system or remote management system 34 can be, for example, a client, a personal computer or a server. A storage means associated with the remote computer 34 can be a non-volatile means such as a direct access storage device (DASD) in the form of a hard disk device, diskette, compact disc or the like.

The local and remote computers 10, 34 are associated one with the other through some form of local area network (LAN) or the like, in which effective communication may be established through electrically conductive connections, through fiber optical links, through infrared or other radiation links, or in other manners. Such a link is indicated in FIG. 1 at 36. The network may be a token-ring network or an Ethernet network, or other known type of network. Each of the computers may be a "personal computer" as defined herein. Alternatively, the remote computer 34 may be some computer having capabilities other than those ascribed herein to a "personal computer", and possibly beyond those capabilities.

While the term "remote" is used with reference to the computer system 34 through which the LAN station local computer system 10 accesses BIOS, that term is used in the sense of indicating separation, rather than in the sense of indicating a large physical distance between the systems. In fact, such system may be physically adjacent in some network arrangements.

The present invention is directed to a system and method for polling client computer systems 10 to detect when they have been removed or stolen from a network such as a LAN, for example. Briefly, the LAN software application running on the remote computer system or server 34 has a list of the client LAN addresses of all of the clients on the LAN. After a predetermined elapsed time (defined by the LAN administrator) the software application sends out a special packet to each client. This packet is used to check for the presence of each of the client systems. When the client receives this packet it transmits a packet back to the LAN indicating it is still on the LAN. If the software application gets a response back then it just moves to the next client. If the software application does not get a response back after a predetermined number of retries, it indicates to the LAN administrator though a message that the client at this location is now not attached to the LAN anc can be assumed missing or stolen.

The software application can either be a stand alone application or integrated into IBM's Netfinity network management software or Intel's LANDesk network management software. The message can take the form of an alert to the LAN administrator's console or user interface.

Referring now to FIGS. 4 through 7, there are shown flow diagrams of the routines executed by the software application in accordance with the present invention. In addition, a table database is shown in FIGS. 5–7. This table is stored in the remote computer 34 and is used by the LAN administrator to keep track of certain information including the MAC address and physical location of a client, whether the client is present now and whether the client is an active client.

As noted above, the LAN adapter 94 is powered by auxiliary voltage (e.g., AUX 5) which is present so long as the system 10 is connected to AC power. Accordingly, the LAN adapter or subsystem 94 is able to respond to packets sent over cable 36 when the system 10 is in any power state (normal operating, sleep, standby, suspend, off, etc.). This allows the system 10 to receive packets and respond regardless of power state. This has the advantage that the present invention does not require the system 10 to be powered to a normal operating or ON state to operate.

Figure 4:
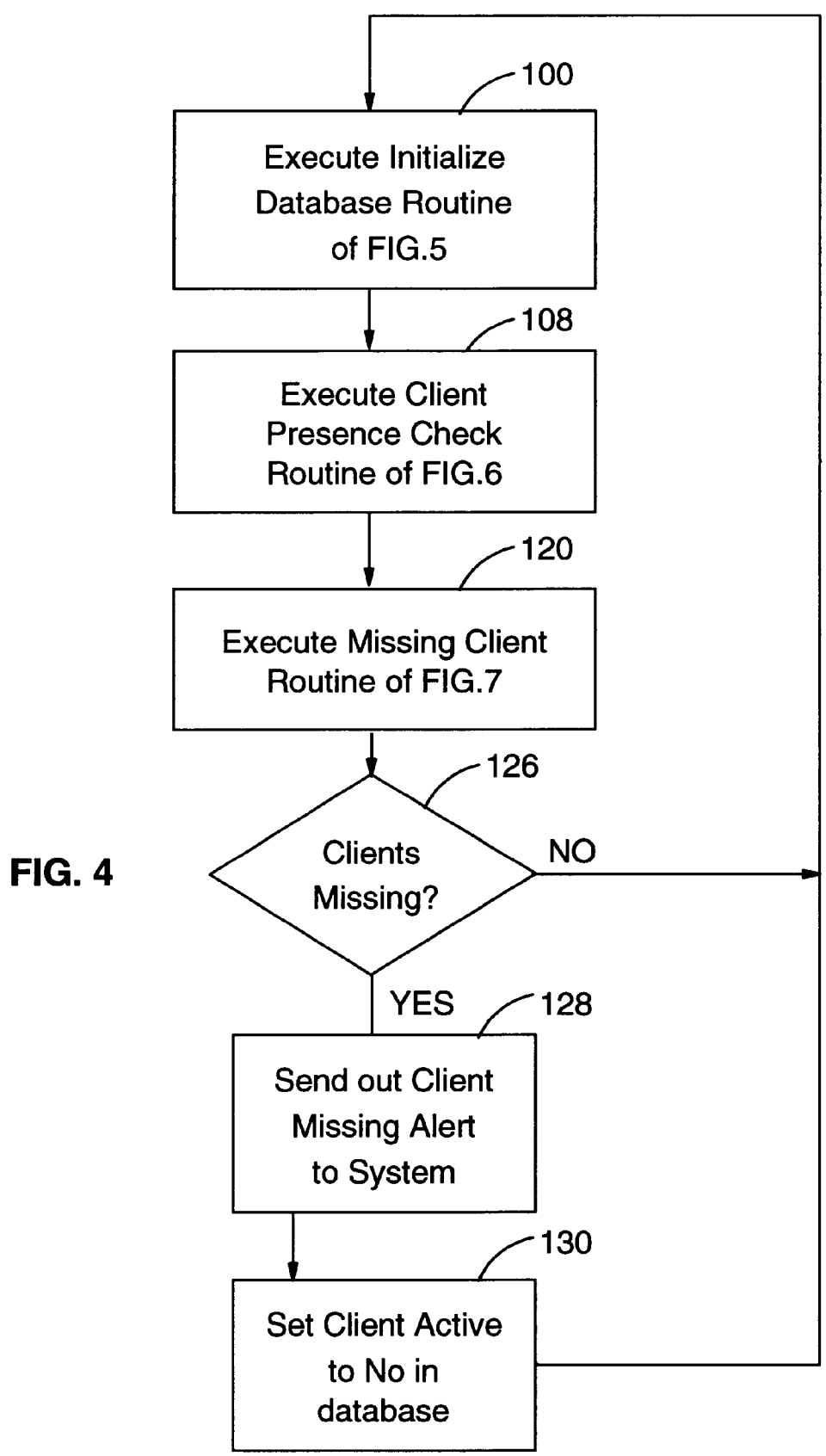
FIG. 4 is a flow diagram of a main routine executed by an application program on the remote computer 34, by a LAN administrator in accordance with the present invention.

As shown in FIG. 4, the main routine is executed by the application program on the remote computer 34. The first step of the main routine is to execute an initialize database routine at 100. The initialize routine will initialize the table database by setting the Client Present Now column to NO for all clients at 102 (as shown in the Table database in FIG. 5). Next, at 104, a "presence check packet" is sent out over the LAN to all active clients in the database. An "active" client is one that the network administrator has decided to check on for one reason or another and should be present. The presence packet contains the address of the client to which it is directed and data indicating the type of packet (e.g., presence check packet or wake on LAN packet). The initialize routine then returns to the main routine at 106.

Next, the main routine will execute a client presence check routine (FIG. 6) at 108. This routine is used to check whether a client system is present by waiting for each client to send a reply to the presence check packet. The application will remain in the client presence check routine for a first predetermined time waiting for all client systems to reply. In addition, the application will resend the presence packet to each client that did not respond after a second predetermined time where the second predetermined time is less than the first predetermined time. The first and second predetermined times are set by the LAN administrator in the application. The two predetermined times can be chosen by the LAN administrator depending on the number of clients in the database and the amount of time the administrator believes is reasonable to wait. For example, for a LAN having ten connected clients, a reasonable first predetermined time can be between 5 and 10 minutes and a second predetermined time can be 1 minute (i.e., send out 10 presence packets and each system 10 will be given a maximum of 5–10 retries if no response).

Figures 6A, 6B:
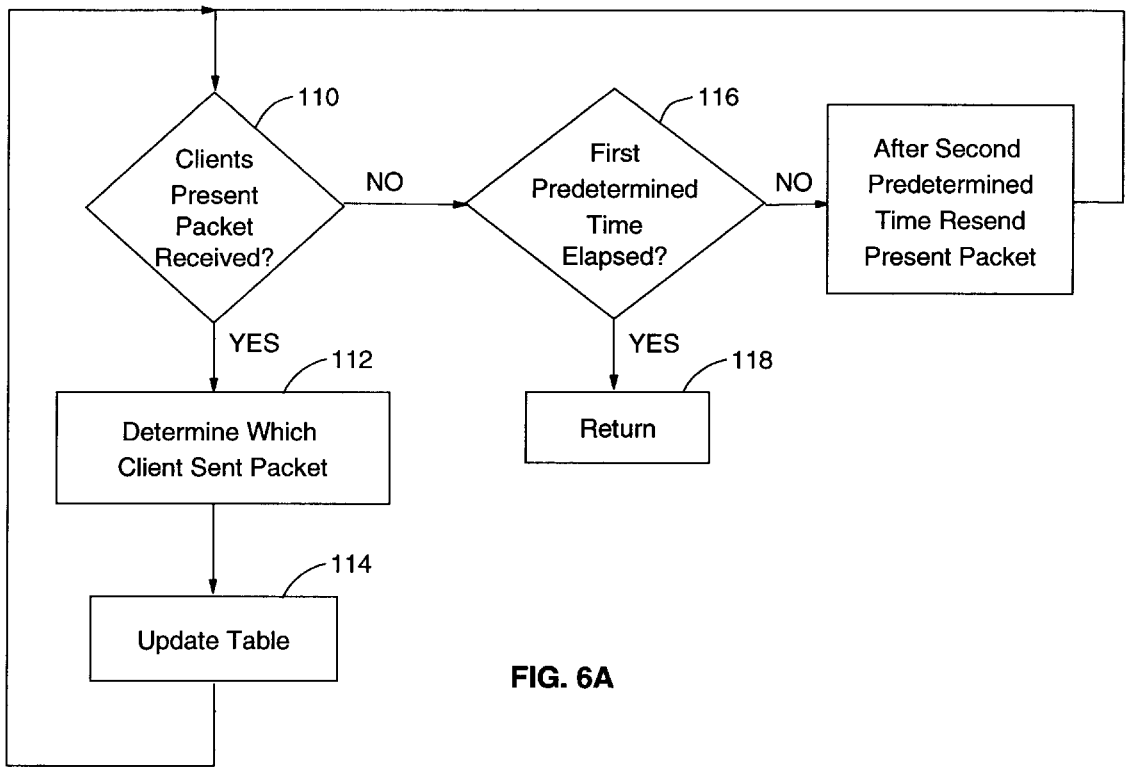
FIG. 6A is a flow diagram of a client check routine in accordance with the present invention.
FIG. 6B is an updated status of the table database of FIG. 5.

Referring now to FIG. 6A, there is shown a flow diagram of the client presence check routine in accordance with the present invention. When a client system 10 receives the presence check packet, it is decoded by the LAN adapter 94 and it responds by transmitting a return packet to the LAN server indicating that the client is present. The return or response packet includes one field with the server IP address of remote computer 34 and another field which contains data indicating that the client is present. The client system 10 will respond regardless of whether it is powered on or not since the LAN adapter 94 is powered by AUX voltage as described above. Accordingly, the client presence check routine first checks whether a client return packet was received by the LAN server at 110. If this packet was received then the YES branch is taken from decision block 110 to block 112 where the LAN program determines which client responded. This determination is made by analyzing the packet data sent by the client as it will contain the client address. Next, execution proceeds to update the Table database (FIG. 6B) by changing the Client Present column from No to Yes for the corresponding client at 114. In the present example, it is client number 2. Execution then proceeds back to decision block 110.

If it is determined at 110 that a client packet has not been received, then the NO branch is taken to 116 where the program checks whether the first predetermined time has elapsed. If the first predetermined time has not elapsed then execution proceeds to block 117 where the presence packet is resent to each client that has not yet responded after the second predetermined time has elapsed. Next, execution returns to decision block 110. On the other hand, if the first predetermined time has elapsed then execution would return to the main routine at 118.

Next, the main routine will check the database for missing clients by executing the routine in FIG. 7 at 120. At block 122, the table database is checked to see if there are any missing clients by comparing the columns Client Present Now to Active Clients and checking whether there are any active clients that have a corresponding No in the Client Present Now column. As an example in FIG. 7, client 4 is missing. Execution then returns to the main routine at 124.

The main routine then checks whether the routine of FIG. 7 had indicated that there were any clients missing at 126. If there were no clients missing then execution proceeds back to block 100 and proceeds as described above. On the other hand, if any of the clients were missing then the YES branch is taken from decision block 126 to block 128 where the remote computer 34 will send out a client missing alert to the system administrator by for example, in the stand alone application, displaying a pop up menu or, if the application is integrated into Netfinity or LAN Desk, the alert would be passed up to the administrator as any other management alert. The administrator can then take whatever action may be appropriate. Next, the Client Active column for the missing client is set to No in the table database at 130. Execution then proceeds back to block 100 and will proceed as described above.

It should be understood by those skilled in the art of the present invention that although the routines of FIGS. 4–7 have been shown as a group of individual routines, the routines may be combined into a single routine.

The present invention provides several advantages to a LAN administrator. Namely, the system owner will receive a quick notification of any system being removed or stolen from the network and the client system need not be powered on for such detection.

While the invention has been particularly shown and described with respect to preferred embodiments thereof, it should be understood by those skilled in the art that the foregoing and other changes in form and detail may be made therein without departing from the spirit and scope of the invention as defined in the appended claims.

What is claimed is:

1. A system comprising:
    at least one computer system connected to a main computer system via a data transmission network,
    said at least one computer system having a network connector for communicating data with said main computer, said network connector being supplied with auxiliary power and being operative to communicate with said main computer regardless of whether said at least one computer system is in a normal operating state,
    said main computer having means for detecting when said at least one computer system has been disconnected from said data transmission network,
    said means includes a program which sends a first packet to said at least one computer system via said network, said at least one computer system being operative to receive said first packet and respond by sending a second packet to said main computer regardless of whether said at least one computer system is in a normal operating state, said second packet including data which specifically identifies said at least one computer system, and
    wherein if said main computer does not receive said second packet said main computer sends an alert message to a network administrator.

2. The system of claim 1, wherein said program waits to receive said second packet until a first predetermined time has elapsed.

3. The system of claim 2, wherein said program is further operative to resend said first packet if said second packet is not received within a second predetermined time, wherein said second predetermined time is less than said first predetermined time.

4. The system of claim 1, wherein said program resends said first packet a predetermined number of times or until said second packet is received whichever occurs first.

5. The system of claim 1, wherein said main computer further includes a data base having segments of stored information, corresponding segments being indicative of characteristics uniquely associated with said at least one computer system.

6. The system of claim 5, wherein said characteristics include an address of said at least one computer system, its physical location, its active status and whether it is present or not.

7. The system of claim 5, wherein said means is further operative to determine whether said at least one computer system sent said second packet, and if so, update said data base to indicate said system is present and further wherein after a first predetermined elapsed time said program checks said data base to determine whether said at least one computer system is present, wherein if said system is not present, said main computer sends out an alert message to a network administrator via said program.

8. The system of claim 1, wherein said network connector is a connector selected from the group consisting of a LAN adapter and a LAN subsystem.

9. A system comprising:
    a plurality of computer systems connected to a main computer system via a data transmission network,
    each of said plurality of computer systems having a network connector for communicating data with said main computer, said network connectors being supplied with auxiliary power and being operative to communicate with said main computer regardless of whether a corresponding computer system is in a normal operating state,
    said main computer having means for determining whether each one of said plurality of computer systems has been disconnected from said data transmission network,
    said means includes a program which sends a first packet to each one of said plurality of computer systems via said network, each one of said plurality of computer systems being operative to receive said first packet and respond by sending a second packet to said main computer regardless of whether said plurality of computer systems are powered on, said second packet including data which specifically identifies said computer system sending the second packet, and
    wherein if said main computer does not receive said second packet from any one or more of said plurality of computer systems said main computer sends an alert message to a network administrator.

10. The system of claim 9, wherein said program waits for a first predetermined time to receive said second packet from each of said plurality of computer systems.

11. The system of claim 10, wherein said program is further operative to resend said first packet to any one or more of said plurality of computer systems for which said second packet was not received by said main computer within a second predetermined time, wherein said second predetermined time is less than said first predetermined time.

12. The system of claim 9, wherein said program resends said first packet a predetermined number of times or until said second packet is received, whichever occurs first, for each of said plurality of computer systems.

13. The system of claim 9, wherein said main computer further includes a data base having segments of stored information, corresponding segments being indicative of characteristics uniquely associated with each of said plurality of computer systems.

14. The system of claim 13, wherein said characteristics include an address of each of said plurality of computer systems, its physical location, its active status and whether it is present or not.

15. The system of claim 13, wherein said means is further operative to determine whether each of said plurality of computer systems sent said second packet, and if so, update said data base to indicate said corresponding computer system is present and further wherein after a predetermined elapsed time said program checks said data base to determine whether each of said plurality of computer systems is present, wherein if any one or more of said plurality of computer systems is not present, said main computer sends out an alert message to a network administrator via said program.

16. The system of claim 9, wherein said network connector is a connector selected from the group consisting of a LAN adapter and a LAN subsystem.

17. A method for detecting when at least one computer system has been disconnected from a data transmission network comprising, providing a plurality of computer systems connected to a main computer system via a data transmission network, said at least one computer system having a network connector for communicating data with said main computer, said network connectors being supplied with auxiliary power and being operative to communicate with said main computer regardless of whether a corresponding computer system is in a normal operating state, sending a first data packet from said main computer to each of said plurality of computer systems via said network, said data packet being encoded to request a second data packet from each of said plurality of computer systems, responding to said first data packet at each of said computer systems which are connected to said network by sending a second packet to said main computer regardless of whether said plurality of computer systems are powered on, said second packet including data which specifically identifies the one of said plurality of computer systems sending said second packet, and sending an alert message from said main computer to a network administrator only if it is determined that at least one of said plurality of computer systems did not send said second packet.

18. The method of claim 17, wherein said detecting step includes:

storing information in a data base indicating which of said plurality of computer systems is connected to said network, and determining which one or more of said plurality of computer systems is not connected to said network by interrogating said data base.

19. The method of claim 18, wherein said storing step includes:

determining which one of said plurality of computer systems sent said second packet, and updating said data base to indicate said computer system is present.

20. The method of claim 19, wherein said responding step further includes:

(1) waiting to receive each of said second packets until a first predetermined time has elapsed, and (2) resending said first data packet to any one or more of said plurality of computer systems for which said second packet was not received by said main computer within a second predetermined time, wherein said second predetermined time is less than said first predetermined time.

21. The method of claim 19, wherein said sending step includes resending said first data packet a predetermined number of times or until said second packet is received, whichever occurs first, for each of said plurality of computer systems.

22. The method of claim 17, wherein said alert message includes data identifying which one or more of said plurality of computer systems is not connected to said network.

* * * * *